Feb. 10, 1959 M. TOTH 2,872,993
POWER STEERING MECHANISM
Filed Oct. 30, 1956 3 Sheets-Sheet 1

Inventor
Michael Toth
By Charles L. Schwab
Attorney

Feb. 10, 1959 M. TOTH 2,872,993
POWER STEERING MECHANISM
Filed Oct. 30, 1956 3 Sheets-Sheet 2

Inventor
Michael Toth
By Charles L. Schwab
Attorney

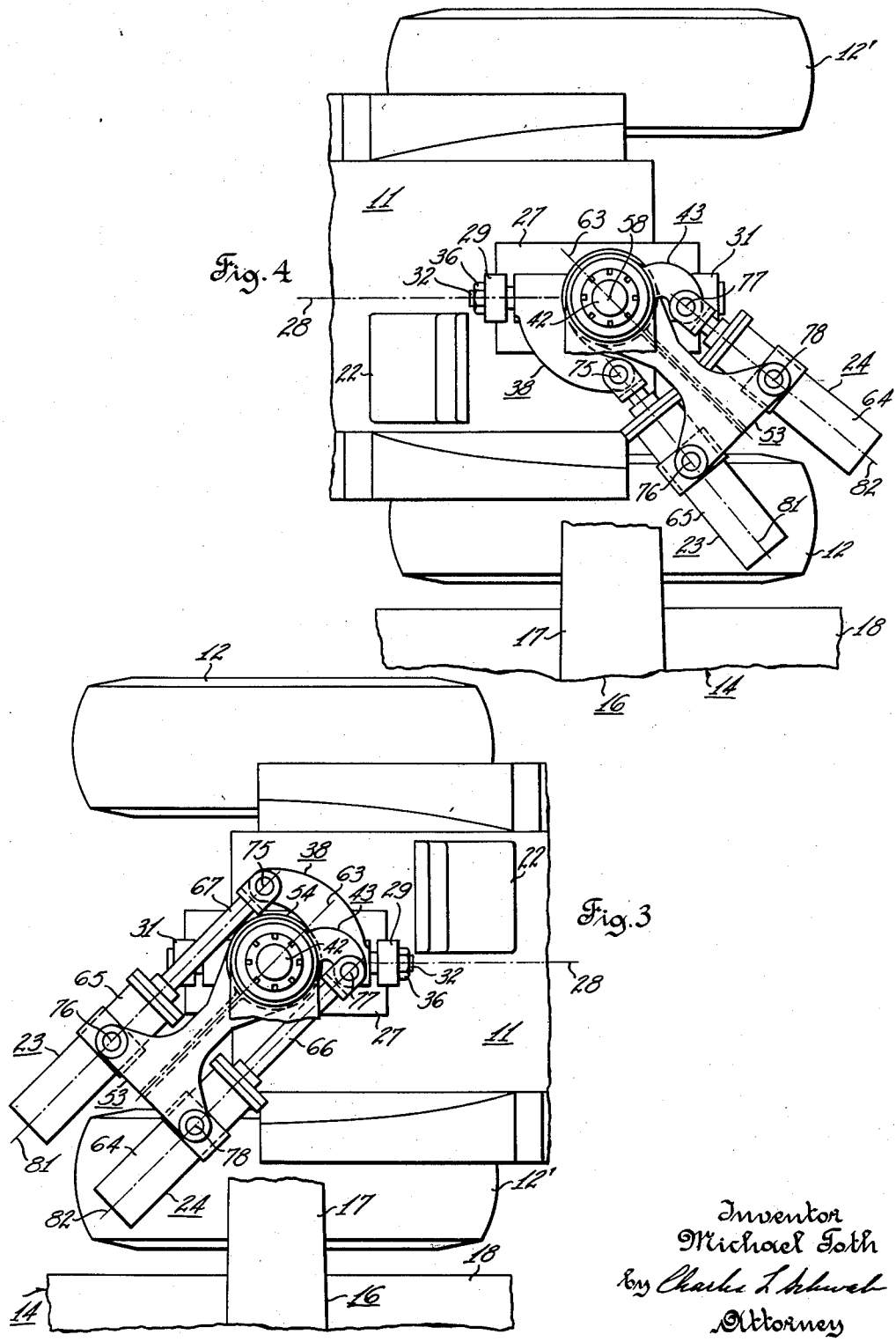

United States Patent Office 2,872,993
Patented Feb. 10, 1959

2,872,993
POWER STEERING MECHANISM

Michael Toth, Springfield, Ill., assignor to Allis-Chalmers Manufacturing Company, Milwaukee, Wis.

Application October 30, 1956, Serial No. 619,148

9 Claims. (Cl. 180—79.2)

This invention relates to a steering mechanism for motor vehicles and is more particularly concerned with a type used for steering an articulated vehicle having pivotally interconnected front and rear units to permit relative angular movement about a pivot post mounted on one of the units.

In the operation of the heavier type of articulated vehicle such as is used in connection with earth handling operations, steering is accomplished by changing the relative angular rotation of the front and rear units. An example of such a vehicle is a two wheel tractor employed as the front draft unit and a scraper or dump wagon, as the rear unit. Such vehicles may handle as much as five to twenty-five cubic yards of material and must therefore be of rugged construction. Since in the two wheel scraper and wagon, a part of the load is borne by the front draft unit, it is necessary that some power means be provided to furnish the substantial amount of torque required to effect any relative movement between the front and rear units.

In view of the length of such vehicles and their use generally for short hauling over difficult terrain, it is particularly desirable that the steering mechanism be capable of delivering a steering torque at the point of articulation throughout the normal steering cycle of 90° to either side of the straight ahead alignment of the vehicle. To achieve this result, it has been customary to employ somewhat complicated hydraulic steering systems. In some cases as many as four hydraulic rams have been employed in conjunction with gears, and in other cases two hydraulic rams were used in conjunction with a number of linkages or chains and sprockets. The use of complicated apparatus increases manufacturing costs, makes maintenance more difficult, makes steering more hazardous to operating personnel, utilizes critical space at the rear end of the tractor unit, and increases the uncoupling time.

In one instance a large single hydraulic ram exerting thrust forces against a strut connected by parallel linkages to torque arms rigidly connected to the front and rear units has been suggested. During the steering cycle the free end of such a steering mechanism not only rotates but contracts and expands with the linear piston motion of the hydraulic rams. Also to provide the necessary steering torque, the single hydraulic ram must be proportionately very large. It is desirable therefore to employ simple hydraulic equipment such as a pair of double acting hydraulic rams operating directly on an integral part of the draft member and the tractor structure.

Although rotation of the hydraulic rams during the steering cycle is desired in order to keep the tangential component of the linear force exerted by the rams fairly constant during the steering cycle, radial reciprocation of the ram introduces an element of hazard to the operator and equipment. It is further desired that the trailing unit can be easily uncoupled from the tractor unit in order to permit the tractor to be used to draw other trailing units.

Generally, it is an object of this invention to provide an improved power operated steering mechanism for vehicles, which incorporates the aforementioned requirements.

More specifically, it is an object of this invention to provide an improved steering mechanism that can be safely operated and readily disconnected from the tractor unit.

Another object of this invention is to provide such a steering mechanism that demands a minimum use of space on the tractor unit and on the trailing unit.

A still further object of the invention is to provide such an improved steering mechanism incorporating a simple arrangement of a pair of linear hydraulic jacks, mounted in approximate lateral alignment with each other along side of the longitudinal axis of front and rear units when they are aligned in a straight ahead relative position.

Another object of this invention is to so construct and dispose the steering mechanism in relationship to the front and rear units so that when the unit is angled through 180° of turning movement, there is adequate clearance provided on both the front and rear units.

Other objects and advantages of this invention are made apparent in the following specification by reference to the accompanying drawings wherein:

Fig. 3 is a view similar to Fig. 2, but illustrating the alignment of the steering mechanism when the tractor is turned 90° to the right from the straight course driving position;

Fig. 4 is a view similar to Figs. 2 and 3, but illustrating the alignment of the steering mechanism when the tractor is turned 90° to the left from the straight course driving position.

Figure 1:
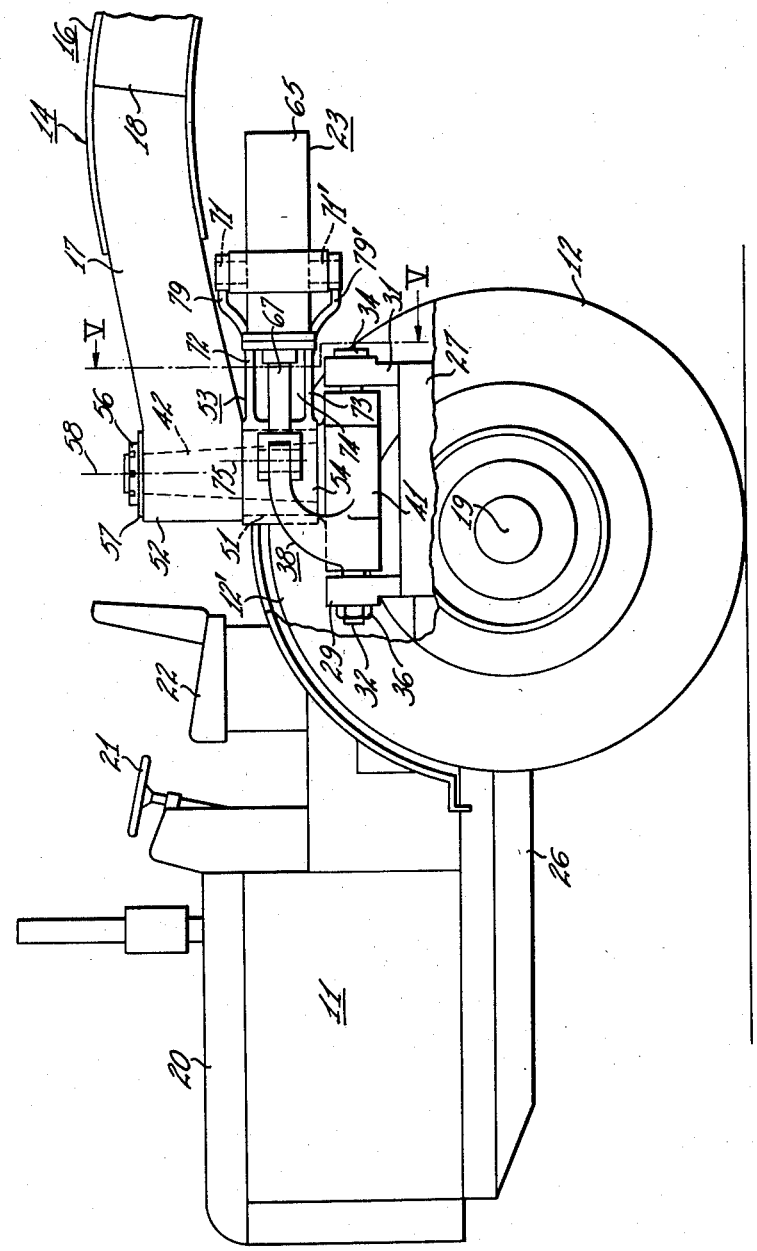
Fig. 1 is a side view of a two wheel tractor and part of the trailer unit with a portion of the tractor wheel cut away to show the steering mechanism of this invention aligned for straight course driving.
Figure 2:
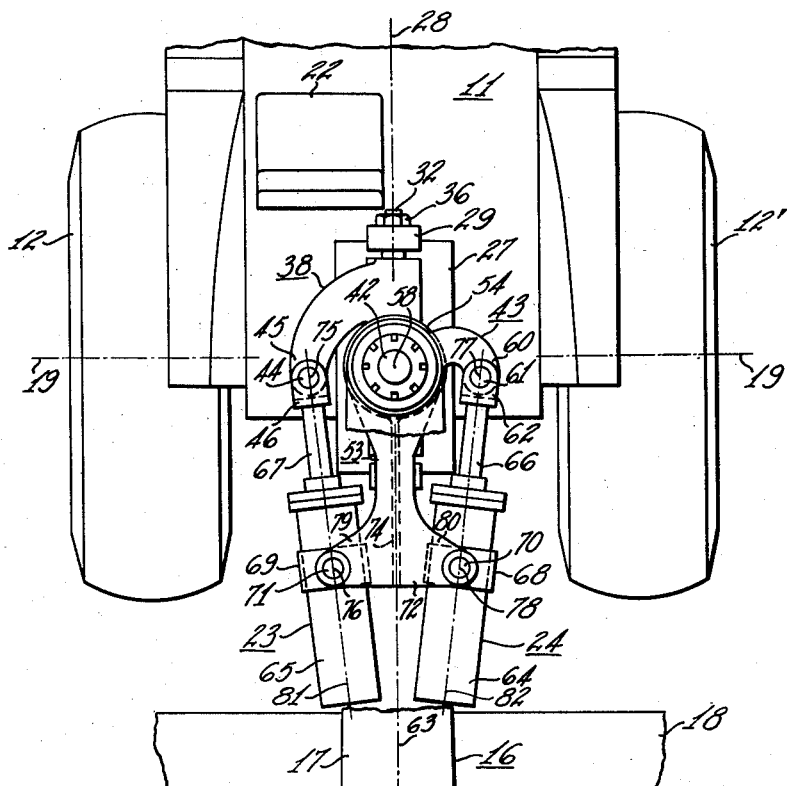
Fig. 2 is a top view of the steering mechanism and the tractor and trailer connections shown in Fig. 1, with part of the trailer gooseneck cut away.

Referring to Figs. 1 and 2, an earth handling vehicle is made up of a two wheel tractor 11 having a pair of traction wheels 12, 12' driven by an engine, not shown, and a rear trailer unit 14. The trailer unit 14 is illustrated as a part of an earth handling vehicle of a conventional type as shown, for example, in the patent to Austin 2,360,823, issued October 24, 1944 and includes a hitch yoke 16 having a gooseneck 17 and transverse frame bar 18. The tractor unit 11 is connected by means of a pivot post assembly, shown in Fig. 5, with a rear trailer unit of which only part of the hitch yoke 16, the gooseneck 17 and the transverse frame bar 18 are shown. The gooseneck 17 and the transverse frame bar 18 are integral parts of the hitch yoke 16, having a pair of rearwardly extending legs, not shown, which are a part of the trailer unit having a pair of ground engaging wheels, not shown, mounted for rotation about an axis parallel to the transverse frame bar 18.

The tractor and trailer unit are aligned for straight course driving when the axis of the tractor wheel axle is parallel to the transverse frame bar 18. The gooseneck 17 is so arched upwardly that when the tractor unit 11 is angled 90° to the left or right of the longitudinal axis of the hitch yoke 16, the steering mechanism, as shown in Fig. 2, passes under the gooseneck 17 with ample clearance.

The tractor unit 11 includes an engine located under a hood 20. This power source is used to drive the traction wheels 12, 12' by means of a suitable power transmitting means, not shown, and also drives a conventional fluid pump, not shown, supplying fluid pressure in a system which includes a hydraulic reservoir and necessary conduits and control valves, not shown, operatively connected with a steering wheel 21, located in front of an operator's seat 22. The steering wheel 21 regulates a conventional hydraulic control valve arrangement which actuates the two hydraulic jacks 23 and 24, provided to supply the thrust forces necessary to operate the steering mechanism, which hereinafter shall be described in detail.

Rigidly fixed on the rearward portion of the tractor main frame 26 and centered along the longitudinal axis 28 of the tractor unit 11 is the hitch subframe 27. Welded to the rear and the front end of the hitch subframe 27 are two upstanding supports 29 and 31, containing bored passages for a horizontal tilting pin 32, having a flanged head 34 at one end and a threaded portion at the other end for a nut 36 to prevent the horizontal tilting pin 32 from being longitudinally displaced within the upstanding supports 29 and 31. A pivot post member has a journal sleeve 41 rotatably mounted on the horizontal tilting pin 32 and has an integrally formed pivot post 42 extending radially upward from the journal sleeve 41. At the forward end of the journal sleeve 41 and extending rearwardly is an integrally connected torque transmitting element or arcuate crank arm 38, having a free end laterally offset from the pivot post 42 and vertically elevated from the horizontal tilting pin 32 to provide necessary clearance for the pivotal movement of the hydraulic rams 23 and 24. The end portion 45 of the crank arm 38 is bored to receive the pivot pin 44 rigidly connected to the piston rod yoke 46.

Referring again to Fig. 1, the gooseneck 17 has at its forward end a journal box or pivot post housing member 52. A frame 53 has journal box 54 mounted on a reduced portion 51 of pivot post housing 52. The pivot post housing 52 rotatably engages the tapered surface of the pivot post 42. A nut 56 and an associated washer 57 secure the pivot post housing 52 against axial separation from the pivot post 42.

Figs. 1, 2, 3 and 4 illustrate the position which the pivot post 42 occupies when the pivot post axis 58 is perpendicular to a horizontal plane passing through the tractor wheel axis 19, such a condition resulting when the tractor wheels 12 and 12' and the wheels of the rear unit 14 are supported on the same horizontal plane, or in other words, when the vehicle is operating on level ground. In this condition the pivot post axis 58 is perpendicular to such a horizontal plane of travel. When the vehicle operates on uneven ground the pivot post axis 58 tilts about the longitudinal pin 32 on the tractor unit 11. Thus, the pivot post axis 58 represents a common axis of rotation for the tractor unit 11, the rear unit and the free floating frame 53.

Integrally formed with the pivot post housing 52 is a torque transmitting element in the form of an arcuate crank arm 43 having a free end portion 60 laterally offset from the pivot post 42 and extending downwardly so that the end portion 60 lies in the same horizontal plane in which the end portion 45 of the crank arm 38 lies. The end portion 60 is bored to receive the crank pin 61 rigidly secured to the piston rod yoke 62 of the hydraulic ram 24.

The power for the steering mechanism, as shown in this specific embodiment of the applicant's invention, is provided by a pair of hydraulic rams 23 and 24 of identical construction. During the various conditions of extension, as shown in Figs. 2, 3 and 4, hydraulic rams 23 and 24 are symmetrically disposed about the longitudinal axis 63 of the floating frame 53. The hydraulic ram 23 has a thrust transmitting element which includes a piston, not shown, and a piston rod 67 and a thrust transmitting element which consists of the cylinder 65.

The hydraulic ram 24 has a thrust transmitting element consisting of a piston, not shown, and a piston rod 66 and another thrust transmitting element which consists of the cylinder 64. Each of the cylinders 64 and 65 are provided with suitable connections at opposite ends, not shown, which supply the fluid pressure to the cylinders from the fluid pressure system hereinbefore described. A conventional hydraulic control valve arrangement, not shown, operated by the steering wheel 21 effectively seals the pressure in the cylinders 64 and 65 so that the tractor unit 11 and the trailer unit may be effectively kept at any selected position of relative angular movement.

The hydraulic cylinder 65 is pivotally connected to the floating frame 53 by means of a pivot collar 69 rigidly secured to the cylinder 65 and a pair of pivot pins 71 and 71' mounted in the upper and lower frame arms 79 and 79' respectively. Similarly, the hydraulic cylinder 64 is pivotally connected to the floating frame 53 by means of a pivot collar 68 and a pivot pin 70 and the underlying pin, not shown. The lower and upper parts of the collars 68 and 69 are journaled to receive the pivot pins 70, 71, 71' and the pin, not shown.

Figure 5:
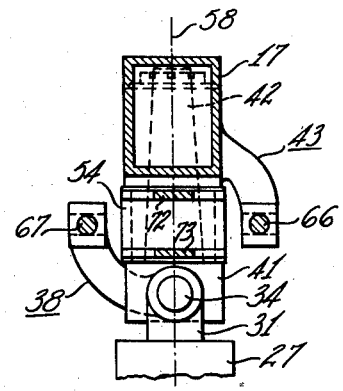
Fig. 5 is a sectional view along the line V—V of Fig. 1.

The frame 53 includes an upper plate 72 and a lower plate 73, vertically spaced by a web plate 74 welded to the upper and lower plates 72, 73 and disposed in a vertical plane passing through the longitudinal axis 63 of frame 53. In the top plan view, as shown in Figs. 3, 4 and 5, the frame 53 is a T-shaped structure having at the forward end journal box 54 and at the other end a transverse portion with an upper plate 72 and a lower plate 73 pivotally supporting the hydraulic rams 23 and 24.

The steering mechanism, as shown in Figs. 2, 3 and 4, essentially embraces a pair of polygonal linkages having a common link defined by the frame 53. The first linkage is formed by this common link, by the journal sleeve crank arm 38 forming a link between the pivot post axis 58 and the crank pin axis 75 and the extensible link formed by the hydraulic ram 23 between the crank arm 38 and the frame 53. The second linkage is formed by the aforementioned common link, the gooseneck crank arm 43, and the hydraulic ram 24 between the crank arm 43 and the frame 53. Each of the polygonal or triangular linkages have a pivot point at each corner. One of these pivot points is common to both quadrilateral linkages and is shown as the pivot post axis 58 in Fig. 2. Two of the other pivot points are laterally opposite each other on either side of the longitudinal axis 63 of the frame 53.

It should be noted that the angular rotation about the crank pin axis 75 and about the pivot post axis 58 is relative to the tractor. Likewise, gooseneck crank arm 43 rotates in an angular direction relative to the tractor about the pivot post axis 58. The hydraulic cylinders 64 and 65 are pivoted about the collar pivot pin axes 76 and 78 in an angular motion relative to the frame 53. In view of this fact, as the gooseneck crank arm 43 is rotated about the pivot post axis 58 through two degrees of angular rotation relative to the tractor, the floating frame 53 rotates through one degree of angular motion relative to the tractor.

Thus, the free end of the steering mechanism, which includes the transverse portion of the frame 53 and the two hydraulic cylinders 64 and 65 and their associated pivot means, lags behind the gooseneck as the rear trailer unit 14 is angled relative to the tractor unit 11. Since the tangential component of the thrust force exerted by the hydraulic rams 23 and 24 is a factor determining the magnitude of the turning torque, this angular lag permits a more efficient utilization of the linear thrust force as it is applied to the gooseneck crank arm 43.

Steering of the vehicle is accomplished by adjusting the angular position of the gooseneck crank arm 43 with respect to the tractor unit 11. The relative angular position of the gooseneck crank arm 43 about the pivot post axis 58 is controlled by the contraction and expansion of the two hydraulic rams 23 and 24. Inasmuch as the sleeve crank arm 38 is rigidly associated with the tractor unit 11 and the hydraulic rams 23 and 24 are pivotally connected to the free floating frame 53, any thrust exerted by the hydraulic ram 23 cooperates with the thrust exerted by the hydraulic ram 24 and is exerted against pivot crank pin 61 of the gooseneck crank arm 43 transmitting a turning torque about the pivot post axis 58.

In Figs. 3 and 4 the hydraulic rams 23 and 24 are shown in their extreme expanded and contracted positions, Fig. 4 illustrating the position of the rams for a 90° turn to the left and Fig. 3 illustrating the expanded position of the rams for a 90° turn to the right. As shown in Fig. 2, the rams are in an intermediate position for straight course driving. In the applicant's embodiment of his invention as shown in Figs. 2, 3 and 4, the piston rods 66 and 67 and the hydraulic cylinders 64 and 65 are of a predetermined length so as to angle the tractor unit 11 90° to the right when the cylinder is at the maximum limit of its expansion as shown in Fig. 3 and when the piston is at its maximum limit of contraction to effect a 90° turn to the left, as shown in Fig. 4. For straight course driving the pistons are located in an intermediate position within the hydraulic cylinders 64 and 65. The use of two hydraulic rams 23 and 24 operating in unison to exert a single turning torque eliminates the necessity for using a timing mechanism such as would be required in some designs involving a greater number of cylinders. In the applicant's invention the hydraulic pistons, not shown, can be returned to their intermediate position for straight course driving without using a timing device.

Since the turning torque applied to the gooseneck crank arm 43 is also functionally determined by the radial distance of the crank pin axis 77 from the pivot post axis 58, the collar pivot pin axes 76 and 78 and the crank pin axes 75 and 77 must be located at a predetermined lateral distance from the longitudinal axis 63 of the bell crank 53 in order that the required magnitude of turning torque may be exerted through the full range of steering from 90° to the left of the straight course driving position and 90° to the right thereof. While in the applicant's embodiment of his invention as disclosed herein, a steering mechanism operating through a range of 90° to the left and to the right of the straight course driving position is shown, it is readily apparent that where a specific application so requires the applicant's steering mechanism can effectuate steering within a range in excess of 90° to either side of a straight course driving position. This can be accomplished by changing the relative lengths of the piston rods 66 and 67, the cylinders 64 and 65 and other associated parts.

As distinguished from some prior practice wherein a single double acting cylinder is used as the common link of the hereinbefore described polygonal linkage forming the applicant's steering mechanism, the applicant employs the nonextensible frame 53 which eliminates objectionable linear rearward movement of the steering mechanism as it is angled during steering movement of the vehicle.

By positioning the hydraulic rams 23 and 24 so that their center lines 81 and 82 lie in the same horizontal plane, the thrust forces generated by the hydraulic rams 23 and 24 are delivered directly along a common horizontal plane to the horizontally aligned end portion 45 of the sleeve crank arm 38 and the end portion 60 of the gooseneck crank arm 43. By thus locating the hydraulic rams 23 and 24 the linear forces generated by the rams are efficiently converted into turning moments about the pivot post axis 58.

By constructing the sleeve crank arm 38 and the gooseneck crank arm 43 in the shape of an arcuate arm extending rearwardly as shown in Fig. 2, a space saving is achieved at the after end of the tractor unit 11 and the space thus saved may be utilized for other purposes.

By reason of the fact that the bell crank 53 is constructed of two T-shaped plates, it is possible by the vertical spacing of these plates to pivotally mount the hydraulic cylinders 64 and 65 in the space underlying the bell crank arms 79 and 80. This results in a very compact arrangement which minimizes the problem of eliminating interference as the steering mechanism is angled during steering of the vehicle.

The trailing unit can be readily uncoupled from the tractor unit 11 by removing the nut 56, the washer 57 and the crank pin 61. Since the removal of three simple parts is involved, the uncoupling time is thereby reduced.

While only one particular embodiment of the applicant's invention has been described herein, it should be understood that the applicant's invention is not restricted thereto and that it is intended to cover all modifications of the invention which would be apparent to one skilled in the art and that come within the scope of the appended claims.

What is claimed is:

1. A steering mechanism for an articulated vehicle having pivotally interconnected front and rear units for relative angular movement about a common vertical pivot axis, said mechanism comprising: a pair of torque transmitting elements operatively connected, respectively with said front and rear units, a floating frame pivotally mounted about said pivot axis in a horizontally rotatable relation to both said units, a first expansible and contractible jack having one of its opposite ends pivotally connected to one of said torque transmitting elements and having the other of its opposite ends pivotally connected to said frame and a second expansible and contractible jack in approximate lateral alignment relative to said first expansible and contractible jack and having one of its opposite ends pivotally connected to the other of said torque transmitting elements and having the other of its opposite ends pivotally connected to said frame, said jacks being disposed rearwardly from said pivot axis.

2. A steering mechanism as set forth in claim 1 wherein said jacks are double acting hydraulic rams each having a cylinder pivotally connected to said frame.

3. An articulated vehicle comprising in combination, a front unit with ground engaging wheels, a rear unit with ground engaging wheels, means connecting said units for steering movement about a common vertical axis, a pair of torque transmitting elements presented, respectively, by said front and rear units and having attaching portions disposed in radially spaced and laterally opposite relation to said axis, a frame mounted on said vehicle for pivoting on said axis relative to both of said units and a pair of jacks each having a first and a second relatively contractible and expansible thrust transmitting components, said first components being pivotally connected to said attaching portions, respectively, and said second components being pivotally connected to said frame, said jacks lying on said laterally opposite sides of said vehicle when said vehicle is in a straight course driving condition.

4. An articulated vehicle as defined in claim 3, wherein said front and rear units are pivotally connected by a draft yoke having a gooseneck portion and wherein said pair of jacks are double acting hydraulic rams having a cylinder element and a piston and rod element forming said thrust transmitting elements, said cylinder elements being pivotally connected to said frame and disposed vertically below said gooseneck when said vehicle is in a straight course driving condition.

5. A steering mechanism for an articulated vehicle having pivotally interconnected front and rear units for relative movement about a common vertical pivot axis, said mechanism comprising: a pair of crank arms secured, respectively, to said front and rear units and having attaching portions disposed, respectively, on laterally opposite sides of said units, a frame mounted on one of said units for pivoting about said common axis in a horizontally rotatable relation to both of said units, a pair of double acting hydraulic rams each having a cylinder, piston and piston rod, separate means pivotally connecting said piston rods to said crank arms, respectively, and separate means for pivotally connecting said cylinders to said frame.

6. A steering mechanism as defined in claim 5, wherein said crank arm secured to said rear unit projects from the forward end of said rear unit.

7. In an articulated tractor-trailer vehicle having the tractor and trailer units pivotally interconnected by a vertical pivot post member and a pivot post housing member mounted, respectively, on said units, a first crank arm secured and projecting from said pivot post member, a second crank arm secured to and projecting from said pivot post housing member, a frame pivotally mounted on one of said members for pivotal movement about the axis of said pivot post member relative to both of said members, said frame extending rearwardly of said pivot post member, a pair of hydraulic rams having center lines disposed in a common horizontal plane, means pivotally connecting the forward ends of said rams to said arms, respectively, and means pivotally connecting the rearward ends of said rams to the rearward end of said frame.

8. A steering mechanism for an articulated vehicle having pivotally interconnected front and rear units for relative angular movement about a vertical axis, said mechanism comprising: a pair of polygonal linkages having a common link pivotally mounted on said front unit for rotation about said vertical axis, a first linkage including said common link, a torque arm secured to said front unit, and a first contractible and expansible thrust transmitting link pivotally connected at one end to said torque arm secured to said front unit and pivotally connected at the other end to said common link; and a second linkage including said common link, a torque arm secured to said rear unit, and a second contractible and expansible thrust transmitting link pivotally connected at one end to said torque arm secured to said rear unit.

9. A steering mechanism for an articulated vehicle having pivotally interconnected front and rear units for relative movement about a common vertical pivot axis, said mechanism comprising: a vertical pivot post member and a pivot post housing member, mounted, respectively, on said units; a first crank arm secured to and projecting from said pivot post member; a second crank arm secured to and projecting from said pivot post housing member; a frame having a collar portion surrounding the lower portion of said pivot post and mounted for pivotal movement relative to said units about said pivot axis and mounted below said housing member; said frame extending rearwardly from said pivot post member; a pair of hydraulic rams having center lines disposed in a common horizontal plane; means pivotally connecting the forward ends of said rams to said crank arms, respectively; and means for pivotally connecting the rearward ends of said rams to said frame.

References Cited in the file of this patent

UNITED STATES PATENTS

| | | |
|---|---|---|
| 2,583,197 | Armington | Jan. 22, 1952 |
| 2,594,695 | Storey | Apr. 29, 1952 |
| 2,614,644 | Gustafson | Oct. 21, 1952 |
| 2,638,998 | Rockwell | May 19, 1953 |
| 2,781,860 | Herr | Feb. 19, 1957 |